April 23, 1957 — R. B. COTTON ET AL — 2,789,780
AIRCRAFT ARRESTING SYSTEM
Filed June 11, 1954 — 3 Sheets-Sheet 3
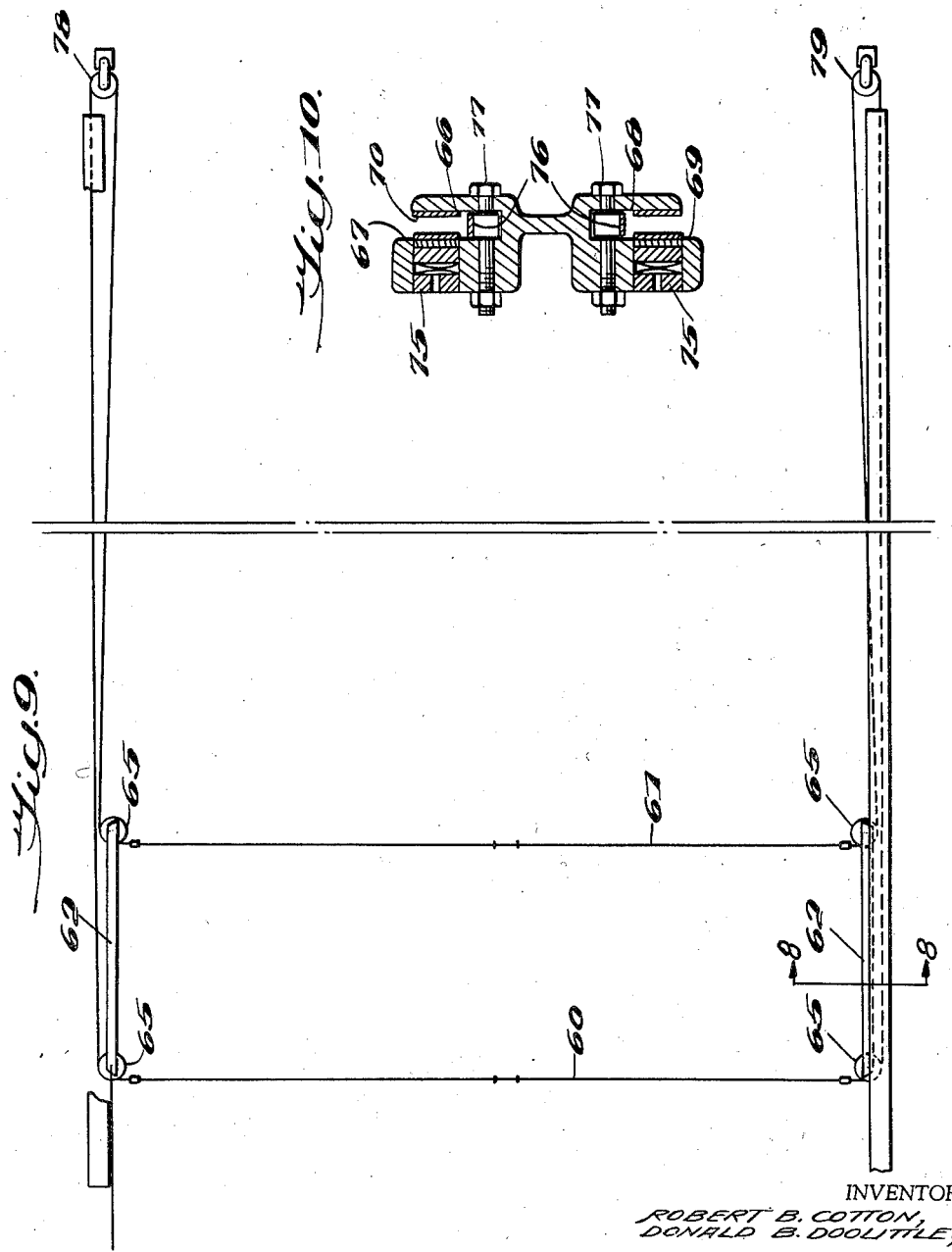
INVENTORS
ROBERT B. COTTON,
DONALD B. DOOLITTLE,
BY Herbert M Birch
ATTORNEY

United States Patent Office 2,789,780
Patented Apr. 23, 1957

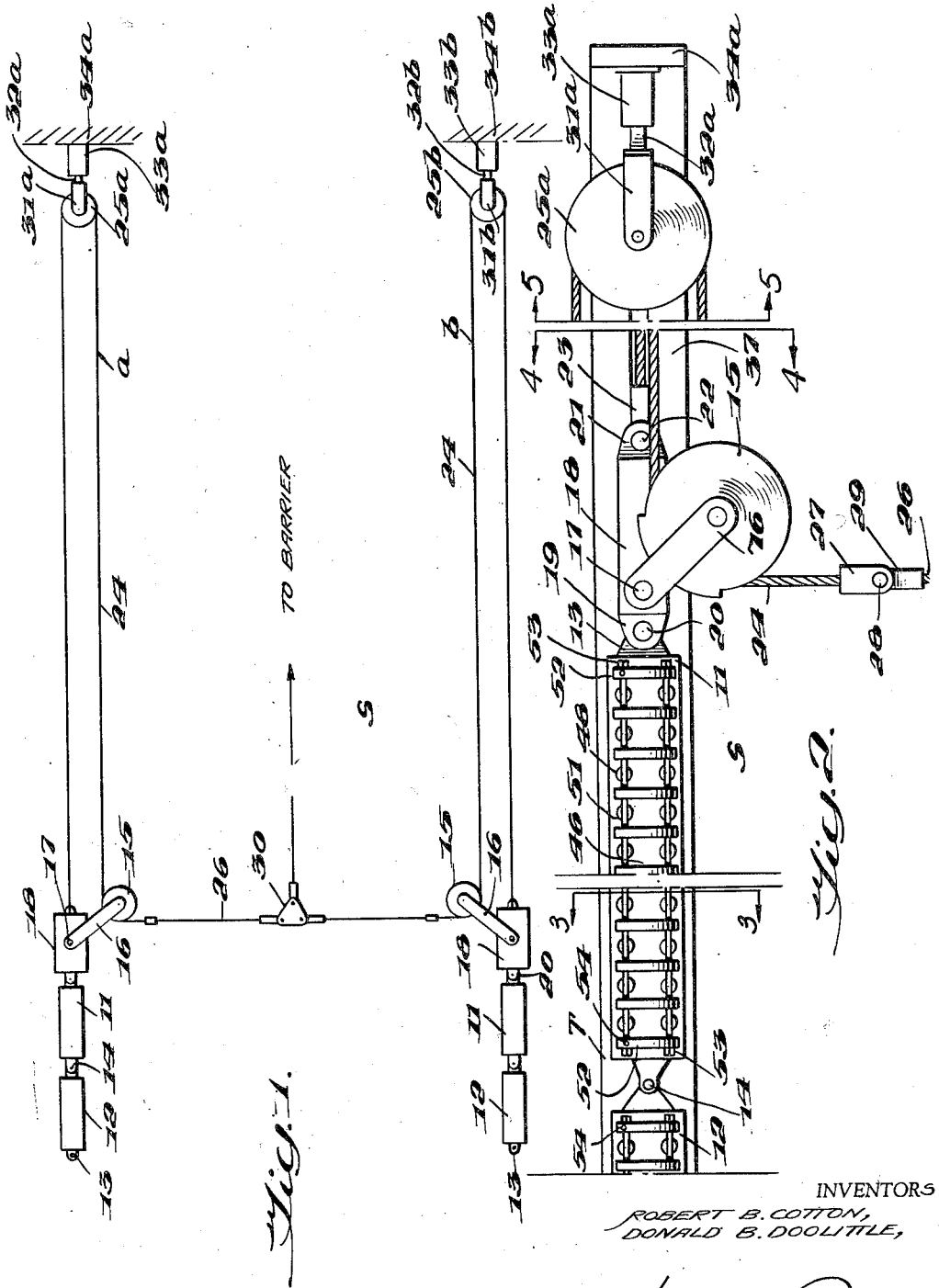

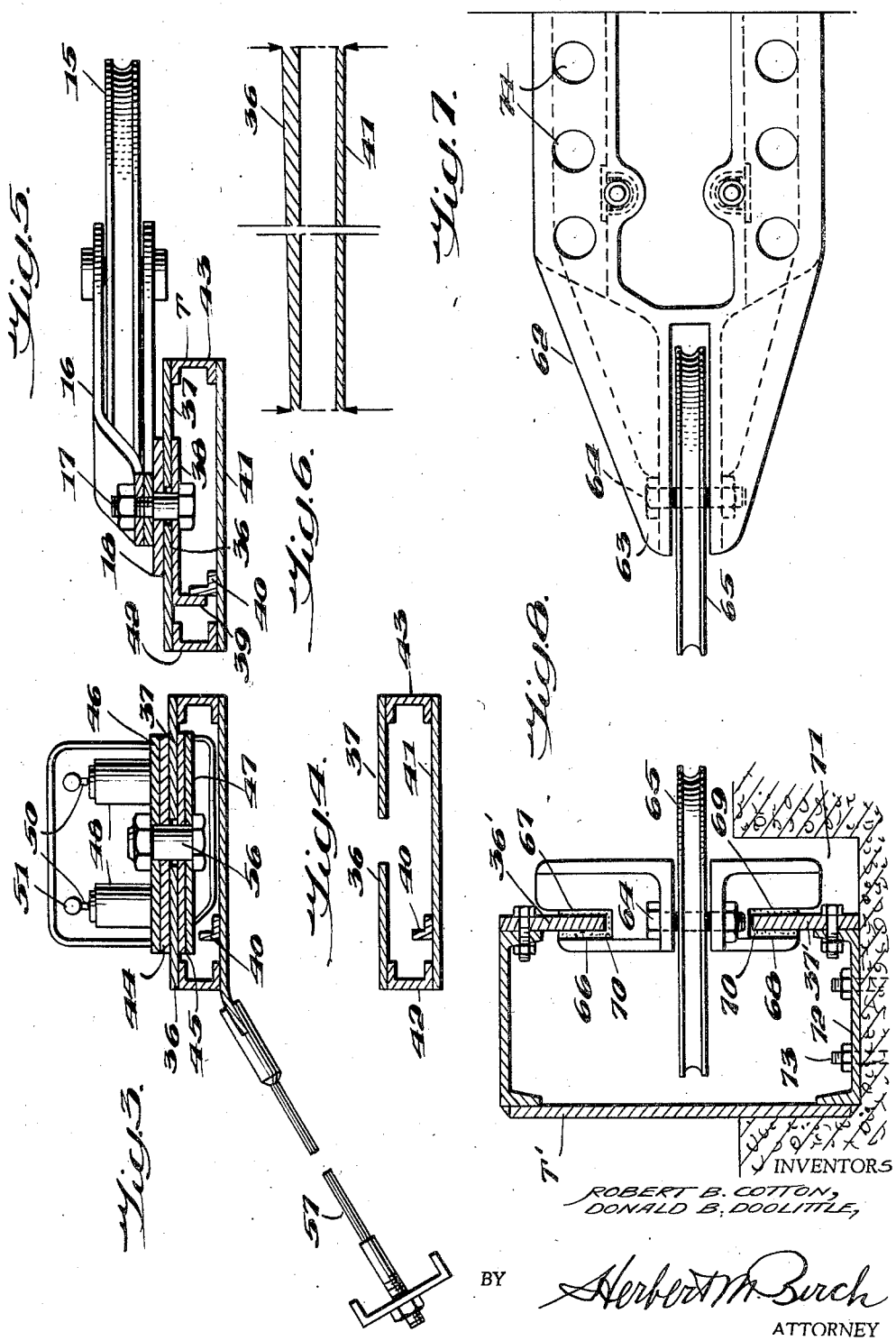

2,789,780
AIRCRAFT ARRESTING SYSTEM

Robert B. Cotton, Media, Pa., and Donald B. Doolittle, Wilmington, Del., assignors to All American Engineering Company, Wilmington, Del., a corporation of Delaware Application June 11, 1954, Serial No. 436,028

11 Claims. (Cl. 244—110)

The present invention relates to an arresting system and more particularly to an energy absorber.

An object of the invention is to provide a novel reeving arrangement of the arrest cable of an arresting gear system whereby a minimum of arrest cable is used and is located in front of the deck pendant or span cable.

Another object of the invention is to provide a novel energy absorber, whereby the cable to be payed out during an arresting action is located in the direction of the arrest.

Another object is to mount the runway sheaves on a travelling shuttle movable in the direction of the arrest, whereby the required relative speed of the cable to be payed out is substantially less than that which would be required from a fixed runway sheave and the cable load necessary to accelerate the moving parts of the arrest mechanism is greatly reduced.

Yet another object is to provide an arresting gear utilizable with a barrier, such as illustrated and described in a co-pending application filed concurrently herewith and providing a single attachment to the deck pendant with equalized payout from each runway sheave, thereby eliminating the need for complex cable arrangements.

Still another object is to provide a novel track structure of tapered thickness for a time delay and reduction in braking force during the peak initial transient cable vibration loads at the start of an arrest.

A further object is to provide an arresting engine and barrier combination satisfactory for high speed arrest; arrest of airplanes of any angle of sweepback; and for arrest of airplanes with or without wheels.

Also another object is to provide the brake of the arresting engine in sections detachably connectable together to adapt the same to different type aircraft and to provide interchangeability.

A further object is to provide an expeditionary arresting system economical in cost, simple in production and low in maintenance.

Other objects and advantages will become apparent from the following description when considered in conjunction with the accompanying drawings wherein an embodiment of the invention is illustrated by way of example. It is to be expressly understood that the drawings are for the purpose of illustration only and are not to be considered as any specific limitation of the invention.

In the drawings, wherein like reference numerals represent like parts in the several views:

Figure 1 is a top plan view of a landing deck with one embodiment of the present invention illustrating the reeving arrangement of the arrest cable around the sheave members, said cable being in advance of the arrest shuttles;

Figure 2 is an enlarged top plan view transversely cut away of one side of the arresting mechanism;

Figure 3 is a transverse section view taken on section line 3—3 of Figure 2 through one of the arrest shuttles and the track adapted to be engaged by the shuttle brake members;

Figure 4 is a transverse section on section line 4—4 of Figure 2 of the track per se;

Figure 5 is a transverse section on section line 5—5 of Figure 2 of the leading end of the loading shuttle showing the connection thereto of the sheave for the deck pendant or span cable on the approach side of the arresting mechanism;

Figure 6 is a fragmentary longitudinal section of the track, illustrating the novel time delay arrangement, whereby in the track rails are tapered progressively larger for predetermined distance at the leading portion of the same;

Figure 7 is a side elevation view of an end portion of a second form of shuttle for an arrest cable system having two spaced apart deck pendants or span cables;

Figure 8 is a vertical transverse section taken on section line 8—8 of Figure 9 of the shuttle shown in Figures 7 and 10 mounted on another form of track;

Figure 9 is a top diagrammatic plan view illustrating the use of the second form of shuttle and the novel reeving of the arrest cable of this form;

Figure 10 is a transverse section view of the shuttle brake members and the fluid inlets for supplying brake fluid to engage the brakes.

Referring in detail to the drawings and first with particular reference to Figures 1 and 2, there is illustrated a landing surface or deck S with a track T extending longitudinally along each side thereof. Slidable on the track at each side of the surface S are one or more arresting means, such as shuttles 11 and 12. When two or more shuttles to a side are used they are detachably coupled together in the manner of a train. For example, each shuttle includes a coupler element 13 formed with an opening to receive a coupling pin 14, thereby permitting interchange of shuttles for different type aircraft wherein speed or weight is to be compensated.

Each leading shuttle 11 of each train carries a sheave 15 in some suitable manner as generally shown in Figure 1 by a yoke 16 pivotally coupled thereto. In Figures 2 and 5 the details of the yoke 16 and its pivotal coupler connection are by a bolt 17 to an elongated coupler plate 18 having a coupler element 19 coupled to the leading shuttle's coupler element 13 by a coupler pin 20 inserted between the elements 13 and 19, respectively. The opposite end of the coupler plate 18 is formed with a similar coupler element 21 and is connected by a coupler pin 22 to a cable end coupler 23 of an arrest cable 24.

The arrest cable may be continuous or may be in two looped sections a and b on each side of the surface S connected together by a deck pendant or span cable 26. The arrest cable 24 extends longitudinally of the track T on each side of the surface S to a fixed sheave 25a or 25b from the shuttle train. At each fixed or anchor sheave 25a and 25b, the arrest cable is reeved and returned around each respective floating shuttle carried sheave 15 from where the cable 24 extends across the deck or surface S as a deck pendant 26 integral with cable 24 or as a coupled part thereof, see Figure 1. For example, when the arrest cable 24 is made in separate similar loop sections a and b, the end of each section reeved off of sheaves 15 includes a cable end coupler 27 with an opening for a coupling pin 28, which fits through a similar opening in a coupler 29 on the adjacent end of the deck pendant 26. Intermediate the deck pendant 26, a barrier coupler 30 may be included similar to the device illustrated in a co-pending application of Robert B. Cotton, filed concurrently herewith and likewise assigned to the present assignee. However, the present arresting system may be used with or without a barrier net, or simply be used with the standard aircraft arrest hook.

Each anchor sheave 25a and 25b is yieldably mounted in bifurcated brackets or yokes 31a and 31b adjustably connected to rods 32a and 32b of hydraulic cylinder anchor dampers 33a and 33b on supports 34a and 34b.

The coupler plate 18 for sheave 15 is shown in Figure 5 connected for sliding movement on the track assembly T. For example, the bolt 17 projects through the ends of the sheave yoke 16, the plate 18 between the rails 36 and 37 of the track unit and through a guide and aligning plate 38. This plate 38 moves with the coupler plate 18 longitudinally between the rails 36 and 37 and is stabilized against lateral movement and guided by a depending guide flange 39 engaging with a single guide member 40 extending longitudinally along the base 41 of the track unit between spacer channel bars 42 and 43.

Shuttle structure

Each energy absorber or shuttle 11 and 12 in Figures 1 through 3, inclusive, are identical in structure and comprise a spring-loaded friction brake having friction shoes 44 and 45 above and below the rails 36 and 37, respectively, see Figure 3, suitably held together. The upper shoe 44 is secured to a brake plate 46 and the lower shoe 45 is secured to brake plate 47 below the rails. These brake shoes are held in frictional engagement with the rails by spring units 48, which are forced against the upper brake plate 46 by cam means 50 carried or formed from elongated rods 51, see Figure 2. These rods 51 are mounted for turning in end blocks 52 by means of their respective hexagonal heads 53, but the rods are normally held fixed in the blocks 52 against turning by pins 54. The pins 54 hold the rod cams 50 engaged with the brake loading springs 48 and thus keep the brake shoes applied to the track rails, until after an arrest has been accomplished. Then the brakes are released by removing the pins 54 from each rod, whereby the rods may be turned to release the brakes by displacement of the cams 50 from the spring units.

The upper brake plate 46 with friction shoe 44 and lower brake plate 47 with friction shoe 45 are slidably connected to each rail 36 and 37 by one or more bolts 56, see Figure 3.

The track unit T may be flush with the ground or deck surface S and for stability is anchored in the surface by anchor means 57. This anchor means compensates for side loads. Each rail 36 and 37 for approximately the first fifteen feet more or less of shuttle or friction brake travel are reduced in thickness and tapered gradually to normal thickness to obtain a time delay and reduction of friction force during peak initial transient cable vibration loads. Also, this time delay allows for low acceleration for the lighter weight airplanes. These loads are damped by the hydraulic anchors 33a and 33b, see Figures 1 and 2.

A second embodiment of this invention is diagrammatically illustrated in Figure 9, wherein the novel reeving system is such as to provide for using two deck pendants, namely 60 and 61. To provide for using two deck pendants a novel form of energy absorber or brake shuttle 62 is developed and also a specially formed track structure T', see Figure 8. Each shuttle 62 comprises a frame with opposite bifurcated ends 63 having aligned openings to receive an axle means, such as a bolt 64 for mounting a sheave 65 at each respective end thereof. The shuttles 62 are longitudinally grooved along each edge to form upper and lower opposed brake surfaces 66 and 67 and 68 and 69. One of these respective surfaces are covered with friction brake linings, such as 70, while the opposite surfaces 67—69 are formed with longitudinally aligned openings 74 for mounting fluid actuated brake shoes 75. Each side of track rails 36' and 37' of track unit T' are gripped by the brake means when fluid is supplied to activate the brake shoes 75. This unit is illustrated countersunk in a pit 71 and anchored therein to channel iron member 72 by bolts 73 or the like so the arresting cable is flush to the surface, and shuttle travel may be facilitated along the rail edges, if desired, by runner means 76 held in position by securing means, such as bolts 77, see Figure 10.

The novel reeving concept in Figure 9 is similar to from 1 in that the deck pendant sheaves travel with their respective energy absorbers or shuttles in the direction of the arrest and the arresting cable is similarly looped forward of the shuttles around anchor sheaves 78 and 79 on each side of the deck surface. In this form, however, each shuttle carries two spaced apart deck pendant sheaves, so as to provide two deck pendants instead of one and the arresting cable is reeved around sheaves 65 fore and aft of the shuttles 62.

The operation of the arresting gear takes place when an aircraft engages the standard deck pendant of either form of the invention shown or it may pull forward on the pendant by use of an attached barrier. When either action occurs the energy absorber shuttles are dragged forward over their respective tracks with their brake elements applied, to thereby gradually decelerate the aircraft being arrested.

During the initial portion of the arrest, for example, the first fifteen feet of brake travel, the reduced section of the track rails shown for form one provides a time delay and reduction of braking force. Also, as the arrest progresses the arrest cable is payed out in the direction of the arrest, such that the required relative speed of the cable to be payed out is substantially less than that which would result with fixed or non-travelling pendant sheaves.

Although only two embodiments of the invention have been illustrated and described in detail, it is to be understood that various changes may be made in the design, arrangement and combination of the parts without departing from the scope of the invention. For a definition of the scope of the invention reference should be had to the appended claims.

What is claimed is:

1. An arresting system including a landing surface, a track on each longitudinal side of the surface, an energy absorbing friction brake device slidable on each track, an arresting cable connected to the leading end of each brake device, a sheave carried by each brake device, and a fixed sheave mounted on each respective longitudinal side of the landing surface in advance of each of said respective brake devices and their respective sheaves, said cable being reeved around each of said fixed sheaves from the said connection to the brake device, looped rearwardly and reeved around each sheave of each brake device and across said landing surface, to thereby form a deck pendant as a part of said cable.

2. An aircraft arresting system for an aircraft landing surface comprising an arresting cable, linearly guided energy absorbers on each side of said landing surface, said cable being connected to said energy absorbers on each respective side of the said surface, a fixed sheave on each respective side of said surface in linear alignment with said absorber of each respective side and in advance thereof in the direction of arrest, a sheave carried by the leading end of each respective energy absorber on each side of said surface, said cable extending continuously from said connection with each respective energy absorber on each respective side of said surface and reeving around each respective fixed sheave and a respective energy absorber carried sheave of each respective side, thereby forming a deck pendant between each of said absorber carried sheaves.

3. The aircraft arresting system described in claim 2, wherein said linear energy absorbers comprise one or more shuttles having spring-loaded friction brake means, and said shuttles are mounted on a track extending longitudinally of each side of said surface, said track having spaced apart rails extending toward said fixed sheaves, said brake means being in frictional engagement with the rails of said track.

4. The aircraft arresting system described in claim 3, wherein the said rails are relatively thinner in cross section adjacent the said deck pendant and are progressively tapered to a greater standard thickness for a predetermined distance.

5. An aircraft arresting system for an aircraft landing surface comprising an arresting cable, an elongated track along each side of said surface, the track on each side having spaced apart rails, a detachable train of shuttle members slidable on the rails of each track, said members each having upper and lower friction brakes engaging the upper and lower sides of said respective rails, said cable being coupled to the leading member of each respective train on each respective side of said surface, a sheave carried by the leading member of each train, and a fixed sheave mounted at the head of each track in advance of each leading train member in the direction of arrest, said cable on each respective side being reeved around one of said fixed sheaves and a respective member carried sheave and extending between said respective member carried sheaves as a deck pendant across said landing surface.

6. The aircraft arresting system described in claim 5, wherein the said upper and lower friction brakes are held engaged by springs, and turnable cam means are carried by said members for loading and unloading said springs.

7. An aircraft arresting system for an aircraft landing surface comprising an arresting cable, an elongated track along each side of said surface, the track on each side having spaced apart rails, a shuttle slidable on the rails of each track, said respective shuttles having opposed brake shoes supported therein, said opposed brake shoes being adapted to grip one of said rails adjacent thereto, said cable being continuously looped from the leading member of each train around a fixed sheave mounted above the landing surface at each respective side and in advance of each respective shuttle, and a sheave carried at each end of each respective shuttle, whereby said cable is reeved around said last-named sheaves of each respective shuttle in connection across said landing surface, thereby forming spaced apart deck pendants movable in the direction of an arrest with said respective shuttles.

8. An aircraft arresting system comprising movable transversely spaced energy absorbers, movable sheave means carried by said absorbers, an arresting cable reeved around each of said energy absorber sheave means and extending transversely between said energy absorbers to form an arresting portion, and fixed sheaves mounted in advance of each of said energy absorbers, said cable being reeved around said fixed sheaves in advance of said movable sheaves carried by said energy absorbers, the respective ends of said cable connecting to said energy absorbers, whereby said cable to be payed out is disposed in the direction of the arrest.

9. An arresting system for a runway having elongated tracks on each side thereof, comprising runway pendant means extending across the runway and reeved around movable side runway sheaves carried by a movable shuttle on each respective track, said shuttles each being provided with brake means engageable with an associated track, a fixed sheave on each side of the runway in advance of each respective movable runway sheave, and an arrest cable continuously connected to said pendant means and reeved around each one of said fixed sheaves in advance of each of said movable side runway sheaves and back around each of said runway sheaves, said arrest cable having an end connecting to each respective shuttle and thereby extending along each respective side of each runway adjacent track always in advance of said shuttles and said pendant means in the direction of an arrest, whereby engagement by a landing aircraft serves to pull said shuttles by said movable sheaves along their respective tracks in the direction of said fixed sheaves.

10. An aircraft arresting system for an aircraft landing surface comprising an arresting cable, linearly guided shuttles having a leading end and a trailing end mounted on spaced apart parallel track on each side of said landing surface, a fixed sheave on each side of said surface in linear alignment with one of said shuttles on each respective side, a sheave carried by the leading end of each of said shuttles, said cable reeving around each respective sheave of each of said shuttles on each side of said surface and extending forward and reeving around each respective fixed sheave in advance of each respective shuttle with each end of the arresting cable being coupled to the leading end of its respective shuttle, thereby forming movable deck pendant means across said landing surface between each of said shuttle carried sheaves, and brake means housed in each shuttle, said pendant when engaged by an aircraft causing said cable to pull said shuttle carried sheaves and their respective shuttles along the tracks.

11. The aircraft arresting system described in claim 10, wherein the said tracks are relatively thinner in cross section adjacent the said deck pendant means and are progressively tapered to a greater thickness for a predetermined distance to thereby provide a time delay action for said energy absorbers.

References Cited in the file of this patent

UNITED STATES PATENTS

| | | |
|---|---|---|
| 454,307 | Tobey | June 16, 1891 |
| 1,306,860 | Smith | June 17, 1919 |
| 1,315,320 | Mesurier | Sept. 9, 1919 |
| 1,499,472 | Pratt | July 1, 1924 |
| 1,502,653 | Bassler | July 29, 1924 |
| 2,151,704 | King | Mar. 28, 1939 |
| 2,483,655 | Schultz | Oct. 4, 1949 |

FOREIGN PATENTS

| | | |
|---|---|---|
| 287,189 | Great Britain | Mar. 12, 1928 |